United States Patent [19]

Carstairs

[11] Patent Number: 5,178,501
[45] Date of Patent: Jan. 12, 1993

[54] AXIALLY ADJUSTABLE SCREW ANCHOR

[76] Inventor: Arturo R. Carstairs, 3244 Alpine Dr., Troy, Mich. 48084

[21] Appl. No.: 784,594

[22] Filed: Oct. 29, 1991

[51] Int. Cl.$^5$ .................. F16B 13/06; F16B 37/04
[52] U.S. Cl. ...................................... 411/55; 411/60; 411/65; 411/182; 24/297; 29/525.1
[58] Field of Search ................ 411/15, 24, 26–28, 411/52, 55, 60, 61, 63, 64, 182, 65; 24/297; 29/522.1, 525.1, 525.2

[56] References Cited

U.S. PATENT DOCUMENTS

| | | |
|---|---|---|
| 3,604,306 | 9/1971 | Denholm . |
| 3,605,846 | 9/1971 | Van Niel et al. . |
| 3,741,067 | 6/1973 | Moran . |
| 3,752,032 | 8/1973 | Fidder . |
| 4,218,954 | 8/1980 | Morel .................. 411/15 |
| 4,438,971 | 3/1984 | Zaydel et al. . |
| 4,453,346 | 6/1984 | Powell et al. . |
| 4,671,717 | 6/1987 | Fukuhara . |
| 4,681,493 | 7/1987 | Vollmer et al. . |
| 4,682,906 | 7/1987 | Ruckert et al. . |
| 4,729,704 | 3/1988 | Yokoyama et al. . |
| 4,786,225 | 11/1988 | Poe et al. . |
| 4,861,208 | 8/1989 | Boundy .................. 24/297 |
| 4,883,382 | 11/1989 | Mushya . |
| 4,984,946 | 1/1991 | Phillip, II .................. 411/55 |
| 4,998,332 | 3/1991 | Dacey, Jr. . |

Primary Examiner—Neill R. Wilson
Attorney, Agent, or Firm—Peter D. Keefe

[57] ABSTRACT

A fastener system for precision mounting of body parts to a frame in spite of unavoidable manufacturing variations, composed of an anchor hole in a frame and an axially adjustable screw anchor seated stationarily into the anchor hole. The axially adjustable screw anchor includes a base for seating into the anchor hole in the frame, an axial sleeve provided in the base, a plunger slidably mounted within the axial sleeve, and a cap connected with the plunger for providing a mounting surface for the body part being mounted to the frame. the plunger and the cap are each provided with an axial hole for a common self-tapping screw-type fastener. In operation, when a tool brings the body part into a predetermined precise relationship with respect to the frame, the body part engages the mounting surface of the cap and causes the plunger to slide into the axial sleeve exactly the right amount so that the mounting surface of the cap is located precisely where the body part is to be mounted for a precise fit. The self-tapping fastener then passes through a predrilled hole in the body part, through the axial hole in the cap, and threads into the axial hole of plunger, forcing expansion of the plunger with respect to the axial sleeve, and thereby freezing the plunger with respect to the axial sleeve, and, as a direct consequence, the body part with respect to the frame.

20 Claims, 2 Drawing Sheets

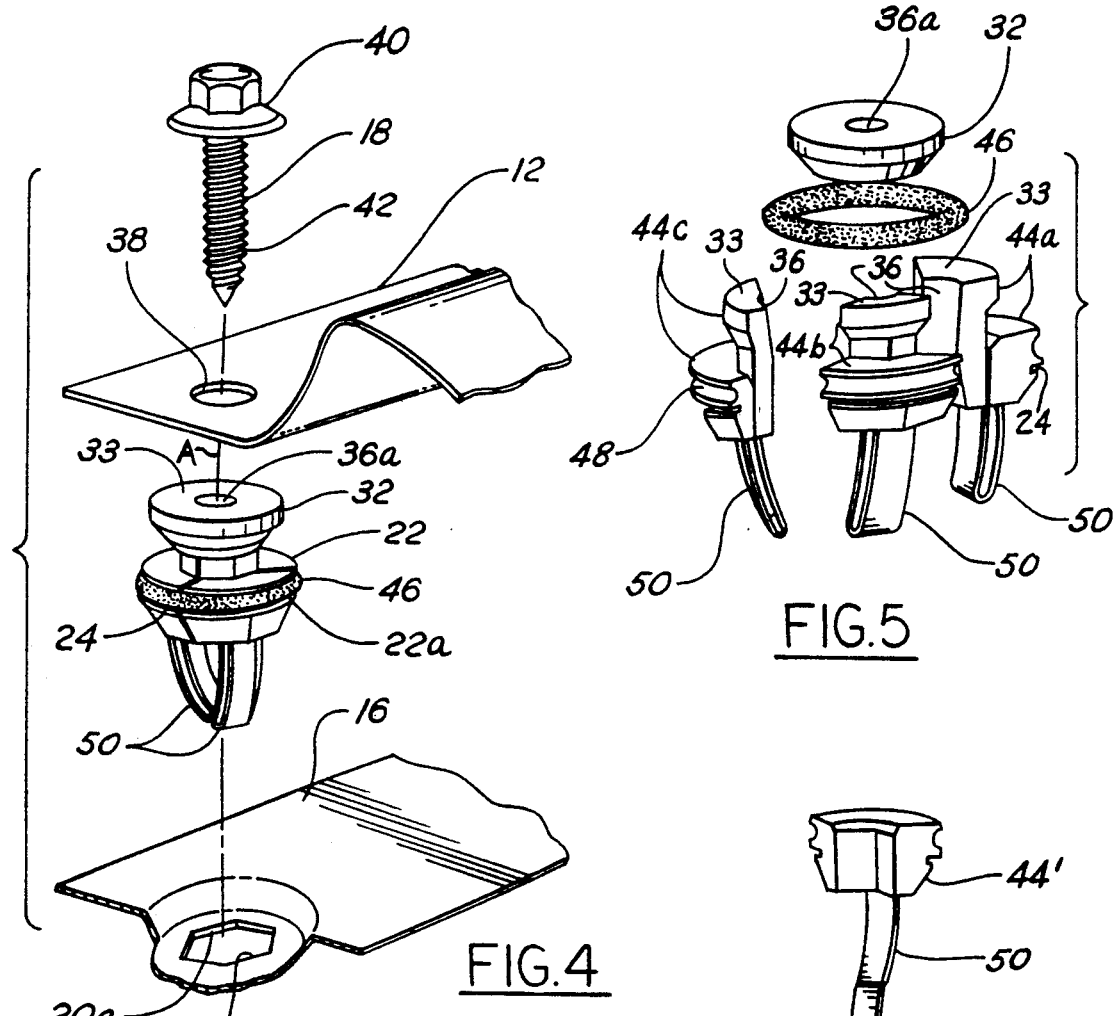
FIG.4
FIG.5
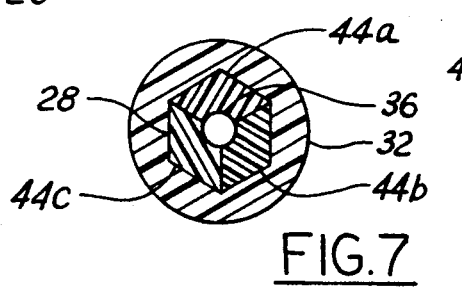
FIG.7
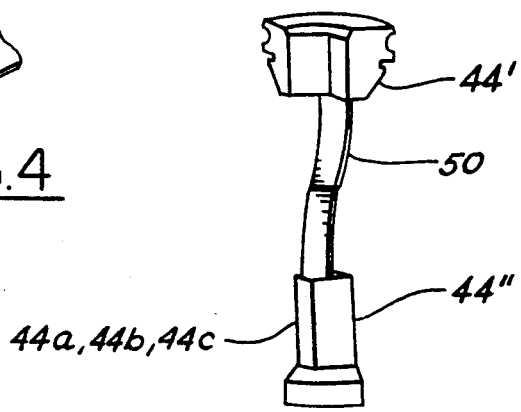
FIG.6
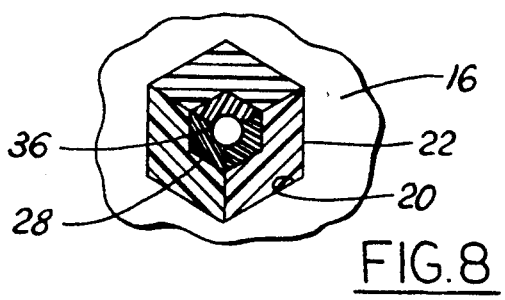
FIG.8

AXIALLY ADJUSTABLE SCREW ANCHOR

BACKGROUND OF THE INVENTION

1. Field of the Invention

The present invention relates to screw anchors used to hold screws with respect to sheet metal parts, and more particularly to a screw anchor which is adjustable in the axial dimension so as to permit precise positional fitting between the sheet metal parts being fastened together by a screw threaded into the axially adjustable screw anchor.

2. Description of the Prior Art

The automotive industry has become increasingly quality conscious over the last several years. One of the most noticeable areas of increased quality has been the ever more precise fit between body parts, such as the fenders in relation to the hood and adjacent doors. In order to ensure a precision fit between the parts being fastened together in the face of unavoidable manufacturing variations, new fastener technologies have emerged which compensate for these manufacturing variations and thereby provide a precision fit of the parts being fastened together. Typically, final fit variations of no more than plus or minus 3.0 millimeters are considered acceptable.

Years ago, shims were used to adjust one part with respect to another. Shims require excessive labor involvement and are subject to imprecision.

More recently, a mill and drill pad fastener system has been developed, described in U.S. Pat. No. 4,438,971 to Zaydel et al, dated Mar. 27, 1984. In this system, pads are welded onto the frame, then the upper surface thereof is precision milled to provide an exact surface location for mounting thereupon the body part. Thereafter a drill hole is provided in the pad, and the body part then fastened to the pad using a common fastener. While this system provides excellent precision of fit with respect to body parts fastened to a frame, there is a considerable drawback in that the pads must be milled and a subsequent drill operation performed.

Still more recently, a form and pierce fastening system has been developed, described in U.S. Pat. No. 4,998,332 to Dacey, Jr., dated Mar. 12, 1991. In this system, a tool approaches the frame and forms a dimpled annular seat into the frame as well as pierces a hole at the base of the annular seat. The annular seat dimension varies from location to location, and is only as deep as is required to provide a predetermined seat for a spacing washer of a predetermined dimension, so that an end surface of the spacing washer provides a precise surface location for mounting thereupon the body part. A common fastener is then used to secure the body part to the hole in the frame at the spacing washer. This method provides the fit precision of the mill ad drill fastener system, yet is cheaper in operation. However, the form and pierce fastener system has drawbacks, too. One drawback is the considerable cost of the form and pierce tooling. Another drawback is that since the form and pierce tool must approach the frame, not all locations thereof are suitably located for access by the tooling. A variation on the form and pierce system is an emboss and pierce system. In this system a tool forms an embossment and hole on the frame, the embossment having a height which precisely provides a predetermined location for mounting the body part thereonto at the hole. This system has the same drawbacks as the form and pierce system, and has the additional problem of requiring tool access from behind the frame. In this regard, the frame upper rail onto which the left or right fender is attached must be provided with a large opening on the lower surface thereof so that access of the emboss and pierce tooling can be gained; this results in a weakened frame.

Accordingly, what remains needed in the art is a fastener system for providing precision mounting of body parts to a frame in spite of unavoidable manufacturing variations, wherein the fastener system is inexpensive, simple to use, universally applicable, and functionally reliable.

SUMMARY OF THE INVENTION

The present invention is a fastener system which provides precision mounting of body parts to a frame in spite of unavoidable manufacturing variations, wherein the fastener system is inexpensive, simple to use, universally applicable, and functionally reliable.

According to the present invention, an anchor hole of contoured shape, such as an hexagonal shape, is provided in the frame. A base is provided which has an exterior contour reciprocal to that of the anchor hole, which press fits into the anchor hole. The base is structured so as to provide an axial sleeve of contoured shape. A plunger having an exterior contour reciprocal to the contoured shape of the axial sleeve is slidably mounted within the axial sleeve. The plunger includes a head located external to the axial sleeve. The head has mounted thereupon a cap which provides a mounting surface for a body part to be mounted to the frame. The plunger and the cap are each provided with an axial hole for a common self-tapping screw-type fastener.

In operation, the plunger is nominally positioned so that the head is located remote from the axial sleeve. When a tool (a positioning jig) brings the body part into a predetermined precise relationship with respect to the frame, the body part engages the mounting surface of the cap and causes the plunger to slide into the axial sleeve exactly the right amount so that the mounting surface of the cap is located precisely where the body part is to be mounted for a precise fit. The self-tapping fastener then passes through a predrilled hole in the body part, through the axial hole in the cap, and threads into the axial hole of plunger. The self-tapping fastener forces expansion of the plunger with respect to the axial sleeve, thereby freezing the plunger with respect to the axial sleeve, and, as a direct consequence, the body part with respect to the frame.

It is preferred for the base and plunger to be constructed of a plurality of components, each of the components having its respective base and plunger parts being connected by a link-spring which serves to naturally locate the plunger part in its nominal position with respect to its base part, and later slides inward with respect to the axial sleeve as the body part is positioned.

Accordingly, it is the primary object of the present invention to provide an adjustable screw anchor which automatically axially adjusts for providing precise relative placement of parts being fastened together via a screw-type fastener threaded with respect to the adjustable screw anchor.

It is another object of the present invention to provide an adjustable anchor for a screw-type fastener in which a portion of the adjustable anchor is axially slidable in conformance with part positioning by another apparatus, and axially freezable into position as a screw-type fastener secures the parts together via threading into the adjustable anchor.

It is a further object of the present invention to provide an automatically adjustable screw anchor which is reliable, easily manufactured and inexpensive to use.

These, and additional objects, advantages, features and benefits of the present invention will become apparent from the following specification.

BRIEF DESCRIPTION OF THE DRAWINGS

FIG. 4 is an exploded perspective view of the axially adjustable anchor according to the present invention, showing operation in connection with assembly of automotive parts.

FIG. 5 is an exploded perspective view of the axially adjustable anchor according to the present invention.

FIG. 6 is a detail view of a component of the axially adjustable anchor according to the present invention.

FIG. 7 is a sectional plan view of the axially adjustable anchor according to the present invention, seen along lines 7—7 in FIG. 3.

FIG. 8 is a sectional plan view of the axially adjustable anchor according to the present invention, seen along lines 8—8 in FIG. 3.

DETAILED DESCRIPTION OF THE PREFERRED EMBODIMENT

Figure 1:
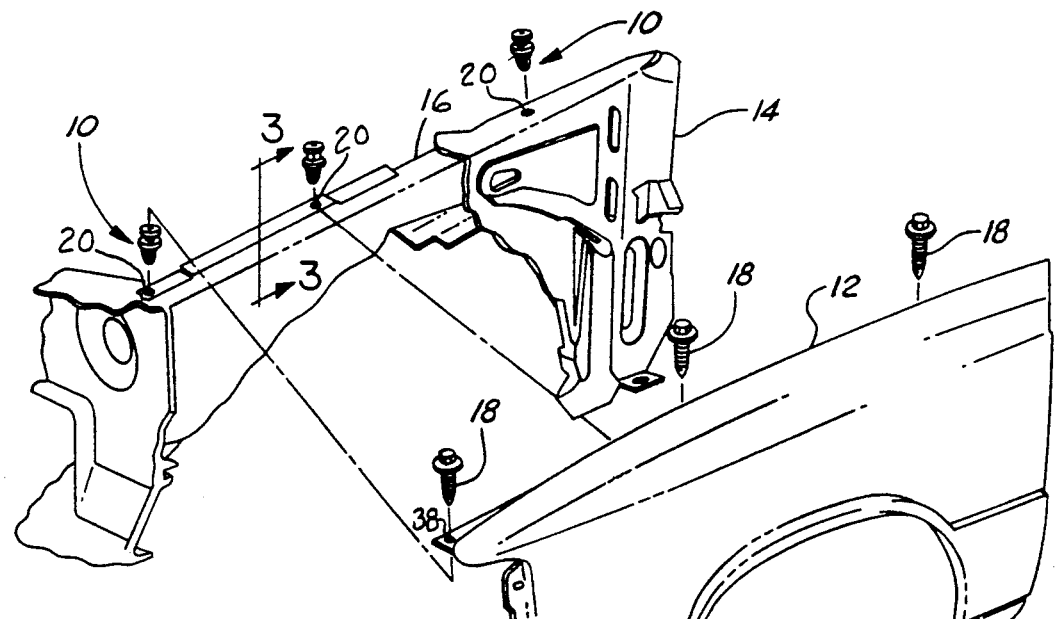
FIG. 1 is an exploded perspective view of the axially adjustable anchor according to the present invention, shown in operation in connection with the assembly of an automobile.
Figure 2:
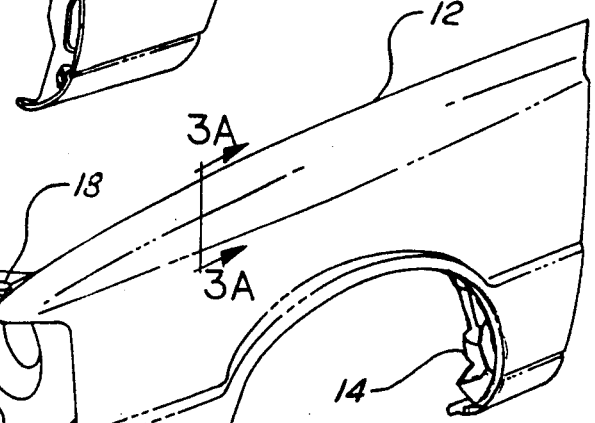
FIG. 2 is a perspective view of the assembled automobile utilizing the axially adjustable anchor according to the present invention.

Referring now to the Drawing, FIGS. 1 and 2 show a typical environment of use of the axially adjustable anchor 10 according to the present invention. In the environment shown, an automotive fender 12 is being connected to an automotive frame 14 at its associated rail 16. The fender 12 is fastened to the rail 16 via common self-tapping screw fasteners 18, each of which threading into a respective axially adjustable anchor 10. The locations of each of the axially adjustable anchors 10 is predetermined according to standard engineering requirements. Each of the locations includes an anchor hole 20 in the frame 14 into which the axially adjustable anchor 10 snappingly fits.

Further to the environment of FIGS. 1 and 2, the fender 12 is desired to be precisely located onto the frame 14 so that the fender precisely fits with respect to other body parts of the car, namely the hood and adjacent door. Because of unavoidable manufacturing variations during production of the fender 12, the frame 14 and its associated rail 16, simply fastening the fender to the rail will not achieve the precision of fit desired. Consequently, the axially adjustable anchor 10 is employed to automatically adjust in the axial dimension as the fender is placed onto the rail to thereby provide a rigid and positionally exactly correct mounting surface to fasten the fender to the rail and achieve the level of precise fit desired.

Figure 3A:
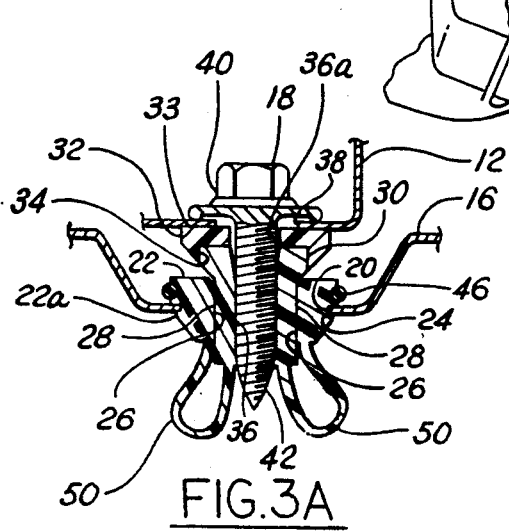
FIG. 3A is a sectional side view of the axially adjustable anchor according to the present invention, shown along lines 3A—3A in FIG. 2.
Figure 3:
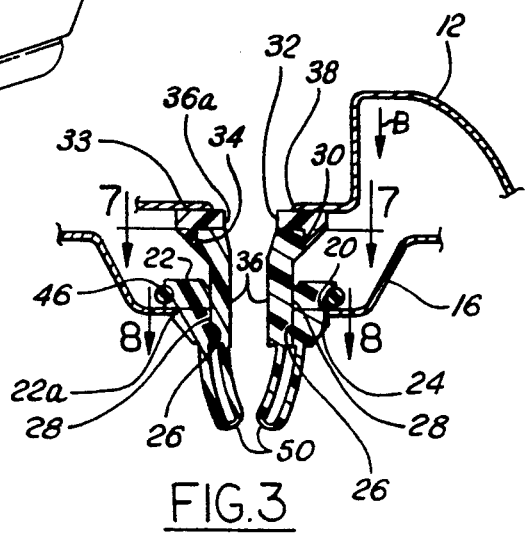
FIG. 3 is a sectional side view of the axially adjustable anchor according to the present invention, shown along lines 3—3 in FIG. 1.

Referring now to FIGS. 3 and 4, an overview of the structure and function of the axially adjustable anchor 10 will be detailed.

At each fastening location, an anchor hole 20 is provided in the frame 14 and its associated rail 16. The anchor hole 20 includes a contour which prevents axial rotation by a base 22 of the axially adjustable anchor 10 when the base is seated in the anchor hole. In the example shown in the Drawing, a hexagonally shaped contour 20a is used; other shapes or provisions, such as a boss, are acceptable for providing anti-rotation of the base 22 with respect to the anchor hole 20. The base 22 has an exterior contour 22a which is reciprocal to that of the contour of the anchor hole 20. The base 22 has an anchor slot 24 which seatingly press fits snappingly into the anchor hole 20, thereby holding the base stationary with respect to the frame. The base 22 is structured so as to provide an axial sleeve 26 having a contoured shape; the axial sleeve defines an axial axis A along its axial centerline. A plunger 28 of a contour reciprocal to that of the contoured shape of the axial sleeve 26 is slidably mounted within the axial sleeve. The contours of the axial sleeve 26 and plunger 28 are intended to prevent axial rotation of the plunger with respect to the axial sleeve; accordingly, any anti-rotation shape is acceptable, as is a boss or other such device for this purpose. The plunger 28 includes a head 30 located at a distal end that is external to the axial sleeve 26. The head 30 has mounted thereupon a cap 32 which provides a mounting surface 33 for the fender 12 to be mounted to the frame 14 at the rail 16 thereof. A socket 34 located at an end of the cap 32 opposite the mounting surface 33 provides a seat for engaging the head 30. The plunger 28 is provided with an axial hole 36 for receiving the self-tapping fastener 18 coaxial with the axial axis. The axial hole 36 is smaller in cross-section than that of the threaded shank 42 of the self-tapping fastener 18 so that as the threaded shank threads into the axial hole 36 of the plunger 28, the plunger is caused to radially expand. The cap 32 is provided with an axial hole 36a which serves as a lead hole for the threaded shank 42, and is slightly larger than the cross-section of the threaded shank so that the threaded shank can pass therethrough without threading. A preferred construction material for the axially adjustable anchor 10 is a high impact plastic.

In operation with respect to each of the axially adjustable anchors 10 shown in FIGS. 1 and 2, the anchor slot 24 of the base 22 is snap fit into the anchor hole 20 and the plunger 28 is nominally located so that the head 30 is located remote from the axial sleeve 26 of the base 22. As shown in FIG. 3, when a tool (not shown) brings the fender 12 into a predetermined precise relationship with respect to the frame 14 and its associated rail 16 along arrow B, the fender engages the mounting surface 33 of the cap 32, thereby causing the plunger 28 to slide into the axial sleeve 26 exactly the right amount so that the mounting surface of the cap is located precisely so as to provide a mounting location exactly where the fender 12 is to be mounted for a precise fit. The fender is provided with a hole 38 at each of the locations of the axially adjustable anchors 10. The fender holes 38 are oversized in relation to the cross-section of the threaded shank 42 of the self-tapping fastener 18 so as to allow limited positional alignment sliding of the fender with respect to the frame in a direction perpendicular to the axial axis A. As depicted in FIG. 3A, the self tapping fastener 18 passes through the fender hole 38, passes through the axial hole 36a of the cap 32, and threads into the axial hole 36 of the plunger 28. This threading forces expansion of the plunger 28 with respect to the axial sleeve 26, thereby expanding the base 22 at the anchor slot 24 abutably against the anchor hole 20. As a consequence, the plunger is frozen with respect to the axial sleeve, preferably, but not necessarily exclusively, by frictional action, the base 22 is held tightly and immovably with respect to the fender hole 38, and as a direct consequence thereof, the fender 12 with respect to the frame 14.

While the aforesaid description relates to axial accommodation of manufacturing irregularities, lateral manufacturing irregularities are accommodated by utilization of a flanged screw head 40 on the self-tapping fastener 18. The flanged screw head 40 has a cross-section larger than that of the fender hole 38. Since the fender hole 38 has a cross-section larger than that of the threaded shank 42 of the self-tapping fastener 18, the fender 12 can be laterally positioned in any location which yet permits the threaded shank to pass through the fender hole. The amount of lateral play available is dependent upon the relative cross-sections of the fender hole 38 and the threaded shank 42. When the self-tapping fastener 18 is finally threaded tightly into the plunger 28, the flanged screw head 40 will engage the fender 12 holding it rigidly with respect to the frame 14.

The preferred construction of the axially adjustable anchor 10 is depicted in FIGS. 5 through 8, which is described herein by way only of preferred example of carrying-out the invention.

The axially adjustable anchor 10 is composed, in part, of three identical components 44a, 44b and 44c. Each of the components forms a third of the base 22 and a third of the plunger 28. Thus, when assembled together the components 44a, 44b and 44c form the base 22 and the plunger 28. Upon assembly, the base 22 is held into a unit by operation of a resilient "O" ring 46 which fits into an annular slot 48 on the exterior of the base. As depicted in FIG. 6, each component 44a, 44b and 44c has its base constituent 44' and plunger constituent 44" held mutually together via a resilient link-spring 50. When the components are assembled, the respective link-springs act as folded, spring biased living hinges which serve to bias respective plunger constituents outwardly from the axial sleeve so that the assembled plunger 28 is biased into the nominal position described hereinabove.

To those skilled in the art to which this invention appertains, the above described preferred embodiment may be subject to change or modification. In this regard, the cap can be anything which provides a mounting surface on the plunger for engaging the body part being mounted. Indeed, the cap may be itself integrally connected with the plunger so that the cap and the head of the plunger are one in the same. Further, the plunger and base can be constructed of one or more components, and a fastener other than a self-tapping screw can be used. Further, the plunger slidable interaction with the axial sleeve of the base may be further regulated by use of mutually interlocking knurled surfaces on each of the plunger and the axial sleeve, or the like. Further still, a resilient tab may be mounted to each of the plunger components at the axial hole portion thereof which mutually biasably interact so as to keep the plunger and base components resiliently seated in the anchor hole until the self-threading fastener has been threaded into the plunger. Further yet, while in the foregoing description of the preferred embodiment the base is structured so as to be expandably forced against the anchor hole as the self-tapping fastener threads into the plunger, the base may constructed of a non-expandable material, such as metal (and, if desired, connected with the frame by welding or other suitable means), in which case threading of the self-tapping fastener into the plunger expands the plunger against the axial sleeve, thereby freezing the position of the plunger with respect to the base. While an automotive environment of use has been described hereinabove, the present invention is not limited to such an environment of use. Such change or modification can be carried out without departing from the scope of the invention, which is intended to be limited only by the scope of the appended claims.

What is claimed is:

1. An axially adjustable anchor for being seated into a hole in a first object and for receiving a threaded fastener so as to fasten a second object in a predetermined precise fit with respect to the first object, said axially adjustable anchor comprising:
    a base, said base having an axial sleeve, said axial sleeve defining an axial axis;
    seat means connected with said base for seatably mounting said base stationary with respect to the hole in the first object;
    a plunger slidably mounted to said base coaxial with respect to said axial axis, said plunger being located partly within said axial sleeve of said base, said plunger having a head located at a distal end of said plunger remote from said axial sleeve, said plunger having a first axial hole coaxial with said axial axis for threadably receiving the threaded fastener;
    antirotation means connected with said plunger and said axial sleeve for retaining said plunger in a fixed rotational position about said axial axis; and
    mounting surface means connected with said head of said plunger, said mounting surface means having a mounting surface for mountably engaging the second object, said mounting surface means having a second axial hole coaxial with said axial axis for receiving the threaded fastener;
    wherein said mounting surface of said mounting surface means is selectively positionable with respect to said base by slidable movement of said plunger with respect to said axial sleeve, further wherein said plunger is caused to radially expand against said axial sleeve and thereby be held immovable with respect to said axial sleeve as the threaded fastener threads into said first axial hole after having passed through said second axial hole, said sleeve and said plunger are each respectively structured so that said plunger is slidable with respect to said sleeve and is subject to being made immovable with respect thereto over a range of slidable movement which is substantially more than slight.

2. The axially adjustable screw anchor of claim 1, wherein said base comprises at least two base constituents, further wherein said plunger comprises at least two plunger constituents, said at least two base constituents combining to provide said base, said at least two plunger constituents combining to form said plunger.

3. The axially adjustable screw anchor of claim 2, wherein said plunger is caused to radially expand against said axial sleeve and thereby force said base tightly against the hole in the first object as the threaded fastener threads into said first axial hole after having passed through said second axial hole.

4. The axially adjustable screw anchor of claim 3, further comprising link-spring means for resiliently connecting each base constituent to a respective plunger constituent, each base constituent resiliently connected to a respective plunger constituent forming a component, each said component combining collectively to form said plunger and said base.

5. The axially adjustable screw anchor of claim 4, wherein each said link-spring means biases said head of said plunger to a predetermined position with respect to said base which permits said plunger to be slidable a predetermined distance inwardly with respect to said axial sleeve.

6. The axially adjustable screw anchor of claim 5, further comprising "O" ring means for holding each of said base constituents together so as to collectively form said base; further wherein said mounting surface means comprises a cap for holding each of said plunger constituents together so as to collectively form said plunger.

7. The axially adjustable screw anchor of claim 6, further comprising slot means for seating said base with respect to the hole in the first object.

8. The axially adjustable screw anchor of claim 7, wherein said base and said plunger comprise three components.

9. A system for connecting a first object to a second object, wherein said second object is precisely positioned with respect to said first object, said system comprising:

an axially adjustable anchor, comprising:
  a base, said base having an axial sleeve, said axial sleeve defining an axial axis;
  a plunger slidably mounted to said base coaxial with respect to said axial axis, said plunger being located partly within said axial sleeve of said base, said plunger having a head located at a distal end of said plunger remote from said axial sleeve, said plunger having a first axial hole coaxial with said axial axis;
  antirotation means connected with said plunger and said axial sleeve for retaining said plunger in a fixed rotational position about said axial axis;
  mounting surface means connected with said head of said plunger, said mounting surface means having a mounting surface for mountably engaging the second object, said mounting surface means having a second axial hole coaxial with said axial axis; and
  connection means connected with said base and the first object for connecting the base stationary with respect to the first object; and
a threaded fastener structured for threadably engaging said first axial hole of said plunger and for holding said second object with respect to said first object;
wherein said mounting surface of said mounting surface means is selectively positionable with respect to said base by slidable movement of said plunger with respect to said axial sleeve, further wherein said plunger is caused to radially expand against said axial sleeve and thereby be held immovable with respect to said axial sleeve as said threaded fastener threads into said first axial hole after having passed through said second axial hole, said sleeve and said plunger are each respectively structured so that said plunger is slidable with respect to said sleeve and is subject to being made immovable with respect thereto over a range of slidable movement which is substantially more than slight.

10. The system of claim 9, wherein said plunger is caused to radially expand against said axial sleeve and thereby force said base tightly against the hole in the first object as said threaded fastener threads into said first axial hole after having passed through said second axial hole.

11. The system of claim 9, wherein said threaded fastener comprises a self-tapping screw having a flared head and a threaded shank; further wherein the second object is provided with a mounting hole through which said threaded shank extends, said mounting hole having a cross-section larger than that of said threaded shank but less than that of said flared head.

12. The system of claim 9, wherein said base comprises at least two base constituents, further wherein said plunger comprises at least two plunger constituents, said at least two base constituents combining to provide said base, said at least two plunger constituents combining to form said plunger.

13. The system of claim 12, further comprising link-spring means for resiliently connecting each base constituent to a respective plunger constituent, each base constituent resiliently connected to a respective plunger constituent forming a component, each said component combining collectively to form said plunger and said base.

14. The system of claim 13, wherein each said link-spring means biases said head of said plunger to a predetermined position with respect to said base which permits said plunger to be slidable a predetermined distance inwardly with respect to said axial sleeve.

15. The system of claim 14, further comprising "O" ring means for holding each of said base constituents together so as to collectively form said base; further wherein said mounting surface means comprises a cap for holding each of said plunger constituents together so as to collectively form said plunger.

16. The system of claim 15, further comprising slot means for seating said base with respect to the hole in the first object.

17. The system of claim 16, wherein said base and said plunger comprise three said components.

18. A method for mounting a second object to a first object in which the second object is mounted with a precise predetermined position with respect to the first object, comprising the steps of:
  providing a plunger slidably mounted with respect to the first object;
  positioning an end of said plunger at a predetermined location with respect to the first object;
  moving the second object to a first position with respect to the second object whereat the second object contacts said end of said plunger;
  moving the second object to the precise predetermined position with respect to the first object, the second object simultaneously sliding said plunger with respect to the first object; and
  expanding said plunger with respect to the first object so as to prevent slidable movement of said plunger with respect to the first object, said end of said plunger thereby providing a mounting surface for the second object with respect to the first object at the precise predetermined position;

wherein said step of moving the second object is over a range of slidable movement which is substantially more than slight.

19. The method of claim 17, wherein said step of expanding further comprises the step of fastening the second object to the first object.

20. The method of claim 19, further comprising the steps of:
providing a base having a sleeve; and
non-rotatably connecting said base with respect to the first object;
wherein said step of providing a plunger comprises slidably mounting said plunger into said sleeve of said base.

* * * * *

UNITED STATES PATENT AND TRADEMARK OFFICE
CERTIFICATE OF CORRECTION

PATENT NO. : 5,178,501
DATED : January 12, 1993
INVENTOR(S) : Arturo Carstairs

It is certified that error appears in the above—identified patent and that said Letters Patent is hereby corrected as shown below:

In Claim 18, line 57 of Column 8, beginning "respect to the", after "the" first occurrence, delete "second" and insert therefor —first—.

Signed and Sealed this

Thirtieth Day of November, 1993

Attest:

BRUCE LEHMAN

Attesting Officer

Commissioner of Patents and Trademarks